United States Patent
Uno et al.

(10) Patent No.: US 12,025,864 B2
(45) Date of Patent: *Jul. 2, 2024

(54) COMPOSITE SUBSTRATE FOR ELECTRO-OPTIC ELEMENT AND METHOD FOR MANUFACTURING THE SAME

(71) Applicant: NGK INSULATORS, LTD., Nagoya (JP)

(72) Inventors: Yudai Uno, Nagoya (JP); Tomoyoshi Tai, Inazawa (JP); Jungo Kondo, Miyoshi (JP)

(73) Assignee: NGK INSULATORS, LTD., Nagoya (JP)

(*) Notice: Subject to any disclaimer, the term of this patent is extended or adjusted under 35 U.S.C. 154(b) by 248 days.

This patent is subject to a terminal disclaimer.

(21) Appl. No.: 17/480,870

(22) Filed: Sep. 21, 2021

(65) Prior Publication Data

US 2022/0004030 A1 Jan. 6, 2022

Related U.S. Application Data

(63) Continuation of application No. 17/217,360, filed on Mar. 30, 2021, now Pat. No. 11,150,497, which is a (Continued)

(30) Foreign Application Priority Data

Nov. 8, 2018 (WO) ............... PCT/JP2018/041548

(51) Int. Cl.
*G02F 1/035* (2006.01)
*G02B 6/12* (2006.01)

(52) U.S. Cl.
CPC .. *G02F 1/0356* (2013.01); *G02B 2006/12142* (2013.01)

(58) Field of Classification Search
CPC .......... G02B 2006/12142; G02F 1/011; G02F 1/035
(Continued)

(56) References Cited

U.S. PATENT DOCUMENTS

2002/0048442 A1   4/2002   Kondo et al.
2003/0044100 A1   3/2003   Kondo et al.
(Continued)

FOREIGN PATENT DOCUMENTS

EP   1992949 B1   11/2008
JP   9211404 A    8/1997
(Continued)

OTHER PUBLICATIONS

"Electro-Optical Switches" by Tavlykaev et al., Wiley Encyclopedia of Electrical and Electronics Engineering, pp. 705-719 (Year: 1999).*
(Continued)

*Primary Examiner* — Robert Tavlykaev
(74) *Attorney, Agent, or Firm* — FLYNN THIEL, P.C.

(57) ABSTRACT

A composite substrate for an electro-optic element is disclosed. The composite substrate includes: an electro-optic crystal substrate having an electro-optic effect; a low-refractive-index layer being in contact with the electro-optic crystal substrate and having a lower refractive index than the electro-optical crystal substrate; and a support substrate bonded to the low-refractive-index layer at least via a bonding layer. A plurality of interfaces located between the low-refractive-index layer and the support substrate includes at least one rough interface having a roughness that is larger than a roughness of an interface between the electro-optic crystal substrate and the low-refractive-index layer.

23 Claims, 8 Drawing Sheets

Related U.S. Application Data continuation of application No. PCT/JP2019/027570, filed on Jul. 11, 2019.

(58) Field of Classification Search
USPC .................................................. 385/1–3
See application file for complete search history.

(56) References Cited

U.S. PATENT DOCUMENTS

| | | | |
|---|---|---|---|
| 2003/0223722 | A1 | 12/2003 | Sugita et al. |
| 2006/0257084 | A1 | 11/2006 | Mizuuchi et al. |
| 2007/0053625 | A1 | 3/2007 | Ichioka et al. |
| 2007/0147722 | A1 | 6/2007 | Kondo et al. |
| 2007/0297732 | A1 | 12/2007 | Mason et al. |
| 2008/0037944 | A1 | 2/2008 | Sugita et al. |
| 2009/0034048 | A1 | 2/2009 | Fujimori |
| 2009/0115028 | A1 | 5/2009 | Shimomura et al. |
| 2009/0129718 | A1 | 5/2009 | Shinriki et al. |
| 2009/0297086 | A1 | 12/2009 | Sugamata et al. |
| 2014/0246956 | A1 | 9/2014 | Ballandras et al. |
| 2015/0070709 | A1 | 3/2015 | Porte et al. |
| 2015/0098672 | A1 | 4/2015 | Yamaguchi et al. |
| 2015/0277156 | A1* | 10/2015 | Kondou ............... G02F 1/0356 385/2 |
| 2019/0280666 | A1* | 9/2019 | Akiyama ............ H03H 9/02574 |
| 2019/0288661 | A1* | 9/2019 | Akiyama .................. H03H 3/08 |
| 2019/0372552 | A1* | 12/2019 | Gaudin ............... H03H 9/02574 |

FOREIGN PATENT DOCUMENTS

| | | |
|---|---|---|
| JP | 2000275455 A | 10/2000 |
| JP | 200240502 A | 2/2002 |
| JP | 2003156723 A | 5/2003 |
| JP | 2004145261 A | 5/2004 |
| JP | 2004219845 A | 8/2004 |
| JP | 2006284963 A | 10/2006 |
| JP | 2007264548 A | 10/2007 |
| JP | 201085789 A | 4/2010 |
| JP | 2016191823 A | 11/2016 |
| JP | 201893329 A | 6/2018 |

OTHER PUBLICATIONS

"Electric-field poling in Mg-doped LiNbO3" by Mizuuchi et al., Journal of Applied Physics, vol. 96, No. 11, pp. 6585-6590 (Year: 2004).*

"Second harmonic generation in a domain-inverted MgO-doped LiNbO3 waveguide by using a polarization axis inclined substrate" by Sonoda et al., Appl. Phys. Lett., vol. 71, No. 21, pp. 3048-3050 (Year: 1997).*

Notice of Reasons for Refusal with English translation issued in corresponding Japanese Application No. 2020-002430 dated Mar. 14, 2023 (9 pages).

European Search Report issued in corresponding European Application No. 19881111.9, dated Aug. 11, 2022 (14 pages).

International Search Report, with English translation, issued in corresponding International Application No. PCT/JP2019/027570 dated Aug. 13, 2019 (5 pages).

Written Opinion of International Searching Authority, with English translation, issued in corresponding International Application No. PCT/JP2019/027570 dated Aug. 13, 2019 (12 pages).

Yamamoto et al., "Application of microsandblast machining to LiNbO3 wafer surface for broadband modulators" Proceedings of SPIE, Symposium on Integrated Optics, SPIE, vol. 4277, pp. 351-358, 2001 (9 pages).

* cited by examiner

COMPOSITE SUBSTRATE FOR ELECTRO-OPTIC ELEMENT AND METHOD FOR MANUFACTURING THE SAME

CROSS-REFERENCE TO RELATED APPLICATION

This is a continuation of prior U.S. application Ser. No. 17/217,360, filed Mar. 30, 2021, which is a continuation of PCT/JP2019/027570, filed on Jul. 11, 2019, which claims priority to PCT/JP2018/041548, filed on Nov. 8, 2018, the entire contents of which are hereby incorporated by reference.

TECHNICAL FIELD

The art disclosed herein relates to a composite substrate for an electro-optic element (such as an optical modulator) that uses an electro-optic effect.

BACKGROUND

An electro-optic element such as an optical modulator is known. The electro-optic element can convert an electric signal to an optical signal by using an electro-optic effect. Such an electro-optic element is essential in radio-over-fiber communication, and development thereof is in progress to realize fast and large-capacity communication.

Japanese Patent Application Publication No. 2010-85789 describes an optical modulator. This optical modulator is one type of electro-optic element, and is configured by using a composite substrate. The composite substrate includes an electro-optic crystal substrate and a support substrate bonded to the electro-optic crystal substrate via a bonding layer. Materials having a lower refractive index than the electro-optic crystal substrate are employed in the support substrate and the bonding layer.

SUMMARY

In conventional electro-optic elements including the aforementioned optical modulator, the greater a thickness of a support substrate is, the higher a mechanical strength of a composite substrate (that is, a mechanical strength of the electro-optic element) can be. On the other hand, the larger the thickness of the support substrate becomes, the more likely it is that electromagnetic waves resonate within the composite substrate upon use of the electro-optic element in a radio frequency band (for example, 10 GHz or higher) becomes higher. When such a resonance occurs, a normal operation of the electro-optic element is thereby obstructed, such as by an unintended ripple (fluctuation) occurring in an output signal of the electro-optic element.

Due to this, in the disclosure herein, art that can reduce a resonance of electromagnetic waves in a composite substrate is provided.

SOLUTION TO TECHNICAL PROBLEM

When a high-frequency electric signal is applied to an electro-optic crystal substrate, electromagnetic waves thereby generated propagate iteratively within a composite substrate in a thickness direction while being reflected on surfaces and interfaces of the composite substrate. Further, when such electromagnetic waves overlap each other in the same phase, a resonance in the composite substrate as aforementioned occurs. Due to this, in the art disclosed herein, at least one of a plurality of interfaces present within a composite substrate is configured as a rough interface having a large roughness. According to such a configuration, electromagnetic waves propagating within the composite substrate in a thickness direction are refracted or reflected in various ways on the rough interface, which creates numerous variations in paths along which the electromagnetic waves propagate. Due to this, the electromagnetic waves propagating within the composite substrate can be suppressed from overlapping each other in the same phase in the thickness direction.

A position where the rough interface is located is not particularly limited. However, when the rough interface is an interface that is in contact with an electro-optic crystal substrate, light propagating in the electro-optic crystal substrate could be diffused or absorbed by the rough interface. To address this, the art disclosed herein includes a low-refractive-index layer that is in contact with the electro-optic crystal substrate, and an interface between the electro-optic crystal substrate and the low-refractive-index layer is configured as a smooth interface. According to this, diffusion and absorption of the light propagating in the electro-optic crystal substrate can be reduced, and the light can be enclosed within the electro-optic crystal substrate. Further, as for the rough interface, the resonance of the electromagnetic waves as aforementioned can be reduced by providing the rough interface between the low-refractive-index layer and a support substrate.

In one aspect of the present teachings, a composite substrate for an electro-optic element is disclosed. The composite substrate may comprise: an electro-optic crystal substrate having an electro-optic effect; a low-refractive-index layer being in contact with the electro-optic crystal substrate and having a lower refractive index than the electro-optical crystal substrate; and a support substrate bonded to the low-refractive-index layer at least via a bonding layer. A plurality of interfaces located between the low-refractive-index layer and the support substrate may include at least one rough interface having a roughness that is larger than a roughness of an interface between the electro-optic crystal substrate and the low-refractive-index layer.

According to the aforementioned configuration, resonance of the electromagnetic waves within the composite substrate can be reduced by presence of the at least one rough interface in the composite substrate. On the other hand, since the interface between the electro-optic crystal substrate and the low-refractive-index layer is relatively smooth, diffusion and absorption of light propagating through the electro-optic crystal substrate can be reduced, and the light can be enclosed within the electro-optic crystal substrate.

In another aspect of the present teachings, a method of manufacturing a composite substrate for an electro-optic element is further disclosed. The method may comprise: forming a low-refractive-index layer on a surface of an electro-optic crystal substrate having an electro-optic effect, the low-refractive-index layer having a lower refractive index than the electro-optic crystal substrate; forming a bonding layer on a surface of the low-refractive-index layer formed on the electro-optic crystal substrate; and bonding a support substrate on a surface of the bonding layer formed on the low-refractive-index layer. A roughness of the surface of the low-refractive-index layer before the forming of the bonding layer may be larger than a roughness of the surface of the electro-optic crystal substrate before the forming of the low-refractive-index layer.

According to the aforementioned manufacturing method, the composite substrate that comprises the electro-optic crystal substrate, the low-refractive-index layer being in contact with the electro-optic crystal substrate, and the support substrate bonded to the low-refractive-index layer at least via the bonding layer can be manufactured. Especially with this manufacturing method, the roughness of the surface of the low-refractive-index layer before forming the bonding layer is larger than the roughness of the surface of the electro-optic crystal substrate before forming the low-refractive-index layer. As such, in the manufactured composite substrate, the interface between the low-refractive-index layer and the bonding layer can be configured as an interface having a larger roughness than the interface between the electro-optic crystal substrate and the low-refractive-index layer.

DETAILED DESCRIPTION

Figure 1:
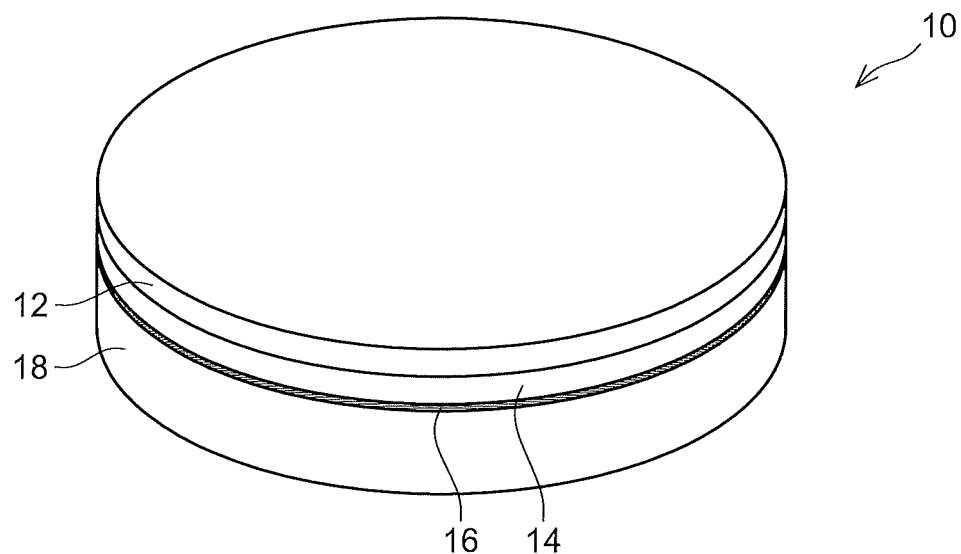
FIG. 1 is a perspective view schematically showing a composite substrate 10 of a first embodiment.

In an aspect of the art disclosed herein, an arithmetic roughness average (Ra) of at least one rough interface having a large roughness may be in a range from 0.5 nm to 10 nm by giving consideration to wavelengths of electromagnetic waves to be refracted or reflected on the interface (s). According to such a configuration, the electromagnetic waves caused by electric signals applied to an electro-optic crystal substrate can effectively be refracted or reflected on the interface(s), and a resonance of the electromagnetic waves in a composite substrate can thereby be reduced.

Here, the arithmetic roughness average (Ra) is defined by JIS B 0031 and JIS B 0601, and a calculation procedure thereof is as follows. Firstly, a profile is extracted over a reference length 1 in a mean line direction from a roughness curve. Next, an X-axis is defined in the mean line direction and a Y-axis is defined in a longitudinal magnification direction for this extracted portion, and a roughness curve thereof is expressed by an equation y=f(x). Then, the arithmetic roughness average (Ra) is calculated by integrating absolute values of deviations of f(x) over the reference length l and dividing those integrated values by the reference length l. A maximum height (Ry) is also well known as an index representing roughness, and in general, the maximum height (Ry) is said to be around five to ten times the arithmetic roughness average (Ra). Based on this relationship, a maximum height (Ry) of the at least one rough interface may be in a range from 2.5 nm to 100 nm.

In an aspect of the art disclosed herein, a thickness of a low-refractive-index layer may be in a range from 0.1 μm to 10 μm. A lower limit of the thickness of the low-refractive-index layer may be at least 0.65 μm, for example from a viewpoint of improving performance of the electro-optic element, and may further be at least 0.7 μm. Further, for example from a viewpoint of reducing the resonance of the electromagnetic waves in the composite substrate by increasing the roughness of the at least one rough interface, the lower limit may more preferably be at least 1.5 μm, and yet more preferably be at least 3 μm. On the other hand, for example from a viewpoint of reducing thermal stress that may be created in the composite substrate, an upper limit of the thickness of the low-refractive-index layer may be 9 μm at most, and further be 7 μm at most.

In an aspect of the art disclosed herein, a thickness of the electro-optic crystal substrate may be in a range from 0.1 μm to 10 μm. A lower limit of the thickness of the electro-optic crystal substrate may be at least 0.3 μm, for example from a viewpoint of reducing light propagation loss, and preferably be at least 0.45 μm. On the other hand, for example from a viewpoint of improving performance of the electro-optic element, an upper limit of the thickness of the electro-optic crystal substrate may be 5 μm at most, and further be 2.8 μm at most.

In an aspect of the art disclosed herein, the roughness of the at least one rough interface may be at least three times a roughness of an interface between the electro-optic crystal substrate and the low-refractive-index layer, or may be at least five times as large, or ten times as large. The lager a difference in the roughness of these two interfaces is, the greater an effect of the art disclosed herein can be.

In an aspect of the art disclosed herein, an arithmetic roughness average (Ra) of the interface between the electro-optic crystal substrate and the low-refractive-index layer may be in a range from 0.03 nm (nanometers) to 0.5 nm, and the arithmetic roughness average (Ra) of the at least one rough interface may be in a range from 0.5 nm to 500 nm. When the composite substrate satisfies these numerical requirements, the composite substrate achieving the effect of the art disclosed herein can be manufactured with a relatively simple procedure.

In an aspect of the art disclosed herein, the at least one rough interface may be an interface between the low-refractive-index layer and a bonding layer. In this case, an arithmetic roughness average (Ra) of the interface between the low-refractive-index layer and the bonding layer may be at least one thousandth (1/1000) of the thickness of the low-refractive-index layer. In addition thereto or as an alternative thereof, the arithmetic roughness average (Ra) of the interface between the low-refractive-index layer and the bonding layer may be at least 0.5 nm, and the thickness of the low-refractive-index layer may be at least 0.5 μm (micrometers). When the composite substrate satisfies these numerical requirements, the composite substrate achieving the effect of the art disclosed herein can be manufactured with a relatively simple procedure.

In addition to or as an alternative to the above, the at least one rough interface may be an interface between the bonding layer and a support substrate. With such a configuration as well, the resonance of the electromagnetic waves within the composite substrate can be reduced by presence of the at least one rough interface in the composite substrate.

In addition to or as an alternative to the above, the composite substrate may further comprise an intermediate layer located between the low-refractive-index layer and the bonding layer. In this case, the at least one rough interface may be an interface between the intermediate layer and the bonding layer. With such a configuration as well, the resonance of the electromagnetic waves within the composite substrate can be reduced by the presence of the at least one rough interface in the composite substrate. A material constituting the intermediate layer may be a material which may be employed in the low-refractive-index layer or in the bonding layer, and further may be a material different from material(s) actually employed in the low-refractive-index layer and the bonding layer.

In addition to or as an alternative to the above, the composite substrate may further comprise an intermediate layer located between the bonding layer and the support layer. In this case, the at least one rough interface may be an interface between the intermediate layer and the support layer. With such a configuration as well, the resonance of the electromagnetic waves within the composite substrate can be reduced by the presence of the at least one rough interface in the composite substrate.

In an aspect of the art disclosed herein, the composite substrate may further comprise a conductive layer constituted of an electric conductor. In this case, the at least one rough interface may include one or more interfaces located between the electro-optic crystal substrate and the conductive layer. When the conductive layer is present inside the composite substrate, the electromagnetic waves propagating through the composite substrate is intercepted without passing through the conductive layer, thus the electromagnetic waves propagate primarily between the electro-optic crystal substrate 12 and the conductive layer. Due to this, the at least one rough interface may be located between the electro-optic crystal substrate and the conductive layer where the electromagnetic waves primarily propagate.

In an aspect of the art disclosed herein, the conductive layer may be at least a part of either the bonding layer or the intermediate layer. In other words, when the bonding layer and/or the intermediate layer are not located between the electro-optic crystal substrate 12 and the at least one rough interface, a part of or all of the bonding layer and/or the intermediate layer may be constituted of an electric conductor such as metal.

In an aspect of the art disclosed herein, the electro-optic crystal substrate may be a substrate of lithium niobate ($LiNbO_3$: LN), lithium tantalate ($LiTaO_3$: LT), potassium titanyl phosphate ($KTiOPO_4$: KTP), potassium lithium niobate ($K_xLi_{(1-x)}NbO_2$: KLN), potassium niobate ($KNbO_3$: KN), potassium tantalate niobate ($KNb_xTa_{(1-x)}O_3$: KTN), or a solid solution of lithium niobate and lithium tantalate.

In an aspect of the art disclosed herein, the low-refractive-index layer may be constituted of at least one substance selected from a group consisting of silicon oxide ($SiO_2$), tantalum oxide ($Ta_2O_5$), aluminum oxide ($Al_2O_3$), magnesium fluoride ($MgF_2$), and calcium fluoride ($CaF_2$).

In an aspect of the art disclosed herein, the bonding layer may be constituted of at least one substance selected from a group consisting of tantalum oxide ($Ta_2O_5$), niobium oxide ($Nb_2O_5$), silicon (Si), aluminum oxide ($Al_2O_3$), titanium oxide ($TiO_2$), gold (Au), silver (Ag), copper (Cu), aluminum (Al), platinum (Pt), and an alloy containing at least two of the aforementioned metal elements.

In an aspect of the art disclosed herein, the support substrate may be a substrate constituted of lithium niobate ($LiNbO_3$: LN), lithium tantalate ($LiTaO_3$: LT), silicon (Si), glass, sialon ($Si_3N_4$—$Al_2O_3$), mullite ($3Al_2O_3 \cdot 2SiO_2$, $2Al_2O_3 \cdot SiO_2$), aluminum nitride (AlN), silicon nitride ($Si_3N_4$), magnesium oxide (MgO), sapphire, quartz, crystal, gallium nitride (GaN), silicon carbide (SiC), or gallium oxide ($Ga_2O_3$). From a viewpoint of reducing resonance of the electromagnetic waves, the support substrate may have conductivity or semiconductivity. For example, lithium niobate and lithium tantalate are insulative materials in their normal state, however, they can obtain conductivity in an oxygen deficient state. So-called black-LN and black-LT are examples of such materials, and a black-LN or a black-LT substrate may be employed as the support substrate.

As aforementioned, the art disclosed herein may be embodied as a method of manufacturing a composite substrate. In this manufacturing method, a bonding layer is formed on a surface of a low-refractive-index layer having a large roughness. Thus, as for a surface of the bonding layer as well, a roughness thereof may become relatively large. However, when a support substrate is to be bonded to the surface of the bonding layer, the surface of the bonding layer is preferably smooth. Due to this, in an aspect of the art disclosed herein, the manufacturing method may further comprise smoothing the surface of the bonding layer between the forming of the bonding layer and the bonding of the support substrate. According to such a configuration, an electro-optic crystal substrate and the support substrate can be well bonded.

In an aspect of the art disclosed herein, the forming of the low-refractive-index layer may comprise forming the low-refractive-index layer by sputter deposition. When the low-refractive-index layer is formed by the sputter deposition, the roughness of the surface of the low-refractive-index layer naturally becomes large. Due to this, by forming the low-refractive-index layer by sputter deposition, the low-refractive-index layer having the surface with the large roughness can easily be formed. In the forming of the low-refractive-index layer by the sputter deposition, the greater a thickness of the low-refractive-index layer is, the larger the roughness of the surface of the low-refractive-index layer becomes. Further, in the forming of the low-refractive-index layer, a process of roughening the surface of the low-refractive-index layer (such as lapping, sand blast, and etching) may be performed as needed.

In an aspect of the art disclosed herein, the manufacturing method may further comprise forming the bonding layer on the surface of the support substrate before the bonding of the support substrate. In this case, the bonding layer to be formed on the support substrate may be constituted of the same material as the bonding layer formed on the low-refractive-index layer, but not particularly limited thereto. According to such a configuration, the electro-optic crystal substrate and the support substrate can be well bonded.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved composite substrates, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS (First Embodiment) A composite substrate 10 of a first embodiment and a manufacturing method thereof will be described with reference to the drawings. The composite substrate 10 of the present embodiment may be employed in various electro-optic elements such as an optical modulator. As shown in FIG. 1, the composite substrate 10 of the present embodiment is manufactured in a form of so-called a wafer, and is supplied to a manufacturer of the electro-optic element. Although this is merely an example, a diameter of the composite substrate 10 may be about 10 centimeters (4 inches). Normally, a plurality of electro-optic elements is manufactured from one composite substrate 10. The composite substrate 10 is not limited to the form of a wafer, and may be manufactured and supplied in various forms.

Figure 2:
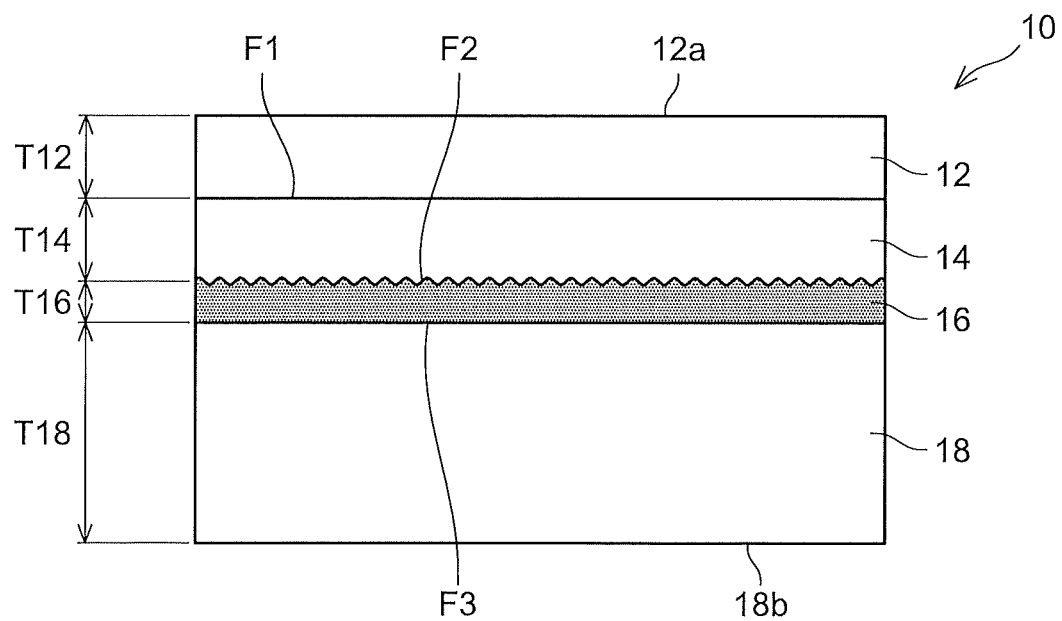
FIG. 2 schematically shows a cross-sectional structure of the composite substrate 10 of the first embodiment.

As shown in FIGS. 1 and 2, the composite substrate 10 includes an electro-optic crystal substrate 12, a low-refractive-index layer 14, a bonding layer 16, and a support substrate 18. The electro-optic crystal substrate 12 is bonded to the support substrate 18 via the low-refractive-index layer 14 and the bonding layer 16. These substrates 12, 18 and layers 14, 16 spread parallel to each other over an entirety of the composite substrate 10.

The electro-optic crystal substrate 12 is a topmost layer of the composite substrate 10, and an upper surface 12a thereof is exposed to outside. A part of or all of the electro-optic crystal substrate 12 serves as an optical waveguide which transmits a light in each of electro-optic elements manufactured from the composite substrate 10. The electro-optic crystal substrate 12 is constituted of a crystal of a material having an electro-optic effect. As such, when an electric field is applied to the electro-optic crystal substrate 12, a refractive index of the electro-optic crystal substrate 12 thereby changes. Especially when the electric field is applied along a c-axis of the electro-optic crystal substrate 12, the refractive index of the electro-optic crystal substrate 12 changes significantly.

Here, the c-axis of the electro-optic crystal substrate 12 may be parallel to the electro-optic crystal substrate 12. That is, the electro-optic crystal substrate 12 may for example be a substrate of a x-cut or a y-cut. Alternatively, the c-axis of the electro-optic crystal substrate 12 may be perpendicular to the electro-optic crystal substrate 12. That is, the electro-optic crystal substrate 12 may for example be a substrate of a z-cut. A thickness T12 of the electro-optic crystal substrate 12 may for example be, but not particularly limited to, at least 0.1 μm and 10 μm at most.

Here, the smaller a thickness T12 of the electro-optic crystal substrate 12 is, the more likely it is that a propagation loss of light increases and a coupling loss with an optical fiber increases. Due to this, the thickness T12 of the electro-optic crystal substrate 12 is preferably at least 0.3 μm, and more preferably at least 0.45 μm. On the other hand, the larger the thickness T12 of the electro-optic crystal substrate 12 is, the more difficult it becomes to realize a high-speed operation and a driving voltage reduction of the electro-optic element. From these viewpoints, the thickness T12 of the electro-optic crystal substrate 12 is preferably 5 μm at most, and more preferably 2.8 μm at most.

A material constituting the electro-optic crystal substrate 12 may be, but not particularly limited to, one of lithium niobate, lithium tantalate, potassium titanyl phosphate, potassium lithium niobate, potassium niobate, potassium tantalate niobate, and a solid solution of lithium niobate and lithium tantalate. The electro-optic crystal substrate 12 may have an electro-optical effect of changing another optical constant in addition to or as an alternative of the refractive index.

The low-refractive-index layer 14 is in contact with the electro-optic crystal substrate 12 under the electro-optic crystal substrate 12. The low-refractive-index layer 14 has a refractive index that is lower than that of the electro-optic crystal substrate 12. Due to this, light propagating through the electro-optic crystal substrate 12 is highly likely to be fully reflected at an interface F1 between the electro-optic crystal substrate 12 and the low-refractive-index layer 14, by which leakage of the light from the electro-optic crystal substrate 12 can be reduced. A material constituting the low-refractive-index layer 14 may be, but not particularly limited to, at least one substance selected from a group consisting of silicon oxide, tantalum oxide, aluminum oxide, magnesium fluoride, and calcium fluoride. A thickness T14 of the low-refractive-index layer 14 may for example be, but not particularly limited to, at least 0.1 μm and 10 μm at most.

The smaller thickness T14 of the low-refractive-index layer 14 is, the more difficult it becomes to satisfy a rate matching condition of the electro-optic element, by which the high-speed operation of the electro-optic element becomes difficult. From this viewpoint, it is preferable that the thickness T14 of the low-refractive-index layer 14 is at least 0.65 μm, and more preferably 0.7 μm. Further, the larger the thickness T14 of the low-refractive-index layer 14 is, the more likely it is that a crack is created in the electro-optic crystal substrate 12 and in the support substrate 18 caused by a thermal stress due to a thermal expansion coefficient difference. Especially in the composite substrate 10 that uses direct bonding, due to absence of a bonding layer with a low elastic modulus and constituted of resin, the thermal stress caused by the thermal expansion coefficient difference is likely to increase easily. Due to this, the thickness T14 of the low-refractive-index layer 14 is preferably 9 µm at most, and more preferably 7 µm at most.

In addition, since the refractive index is proportional to a square root of a dielectric constant, a dielectric constant of the low-refractive-index layer 14 is lower than a dielectric constant of the electro-optic crystal substrate 12. As such, when the composite substrate 10 includes the low-refractive-index layer 14, it becomes easier to satisfy the rate matching condition and adjust a characteristic impedance in the electro-optic elements manufactured from the composite substrate 10. Further, since a floating capacitance and dielectric loss can be reduced, the high-speed operation and voltage reduction of the electro-optic element are realized.

The bonding layer 16 is located between the low-refractive-index layer 14 and the support substrate 18. A thickness T16 of the bonding layer 16 may be, but not particularly limited to, at least 0.01 µm and 1 µm at most. Although details will be described later, in the manufacturing method of the composite substrate 10, the low-refractive-index layer 14 and the bonding layer 16 are formed on the electro-optic crystal substrate 12, and thereafter the support substrate 18 is bonded to the bonding layer 16 by direct bonding. The bonding layer 16 is a coating provided for this direct bonding, and can be configured of a material suitable for the direct bonding. In regard to this point, the material which constitutes the bonding layer 16 may be at least one substance selected from a group consisting of tantalum oxide, niobium oxide, silicon, aluminum oxide, and titanium oxide. Alternatively, the material which constitutes the bonding layer 16 may be at least one of gold, silver, copper, aluminum, platinum, and an alloy containing at least two of the aforementioned metal elements.

The support substrate 18 is a lowermost layer of the composite substrate 10, and its lower surface 18b is exposed to outside. The support substrate 18 is disposed to increase a strength of the composite substrate 10, by which the thickness of the electro-optic crystal substrate 12 can be decreased. A thickness T18 of the support substrate 18 may for example be, but not particularly limited to, at least 100 µm and 1000 µm at most. The support substrate 18 may be, but not particularly limited to, a substrate constituted of lithium niobate, lithium tantalate, silicon, glass, sialon, mullite, aluminum nitride, silicon nitride, magnesium oxide, sapphire, quartz, crystal, gallium nitride, silicon carbide, or gallium oxide. In order to mitigate thermal deformation (especially warping) of the composite substrate 10, the closer a linear expansion coefficient of the support substrate 18 is to a linear expansion coefficient of the electro-optic crystal substrate 12, the more preferable. In regard to this feature, a material constituting the support substrate 18 may be the same as the material constituting the electro-optic crystal substrate 12.

In the composite substrate 10 of the present embodiment, the larger a thickness T18 of the support substrate 18 is, the higher a mechanical strength of the composite substrate 10 (that is, a mechanical strength of the electro-optic element) can be. On the other hand, the larger the thickness T18 of the support substrate 18 is, the more likely it is that the electromagnetic waves resonate within the composite substrate 10 when the electro-optic element is used in a radio frequency band (for example, 10 GHz or higher). When such a resonance occurs, a normal operation of the electro-optic element is thereby obstructed, such as by an unintended ripple (fluctuation) occurring in an output signal of the electro-optic element.

To address the above problem, in the composite substrate 10 of the present embodiment, an interface F2 between the low-refractive-index layer 14 and the bonding layer 16 is configured as an interface with a larger roughness than the interface F1 between the electro-optic crystal substrate 12 and the low-refractive-index layer 14. According to such a configuration, the electromagnetic waves propagating within the composite substrate 10 in the thickness direction are refracted or reflected in various ways on the rough interface F2, which creates numerous variations in paths along which the electromagnetic waves propagate. Due to this, the electromagnetic waves propagating within the composite substrate 10 can be suppressed from overlapping each other in the same phase in the thickness direction.

Especially, the interface F2 between the low-refractive-index layer 14 and the bonding layer 16 is located closer to the electro-optic crystal substrate 12 than for example an interface F3 between the bonding layer 16 and the support substrate 18 is to the electro-optic crystal substrate 12. The closer the rough interface F2 is located with respect to the electro-optic crystal substrate 12, the more different directions the electromagnetic waves can be refracted or reflected in in a vicinity of the electro-optic crystal substrate 12. Due to this, the variations of the propagation path of the electromagnetic waves can further be increased, and a loss caused by the ripples, for example, can be significantly reduced by effective reduction of the substrate resonance. Further, the composite substrate 10 of the present embodiment has a multi-layer structure and multiple interfaces F1, F2, F3 having different dielectric constants are present, resulting in the structure which allows for multipath reflections of electromagnetic waves. Thus, even when an arithmetic roughness average (Ra) of the rough interface F2 is 10 nm at most, the substrate resonance can sufficiently be reduced.

In the composite substrate 10 of the present embodiment, the roughness of the interface F2 between the low-refractive-index layer 14 and the bonding layer 16 may be at least three times a roughness of the interface F1 between the electro-optic crystal substrate 12 and the low-refractive-index layer 14. Alternatively, the roughness of the interface F2 may be at least five times, or ten times the roughness of the interface F1. The larger a roughness difference between these two interfaces F1, F2 is, the greater the effect of the art disclosed herein can sufficiently be.

In the composite substrate 10 of the present embodiment, the arithmetic roughness average (Ra) of the interface F1 between the electro-optic crystal substrate 12 and the low-refractive-index layer 14 may be in a range from 0.03 nm to 0.5 nm. Further, an arithmetic roughness average (Ra) of the interface F2 between the low-refractive-index layer 14 and the bonding layer 16 may be in a range from 0.5 nm to 500 nm. When the composite substrate 10 satisfies these numerical requirements, the composite substrate 10 achieving the effect of the art disclosed herein can be manufactured with a relatively simple procedure.

From a viewpoint of further reduction of the substrate resonance, the arithmetic roughness average (Ra) of the interface F2 is preferably at least 0.6 nm, and more preferably at least 1.5 nm. On the other hand, when the arithmetic roughness average (Ra) of the interface F2 is increased, a film quality of the bonding layer 16 could be degraded, which may result in a reduced bonding strength. Due to this, the arithmetic roughness average (Ra) of the interface F2 is more preferably 10 nm at most, and yet more preferably 7 nm at most.

In the composite substrate 10 of the present embodiment, the arithmetic roughness average (Ra) of the interface F2 between the low-refractive-index layer 14 and the bonding layer 16 may be at least one thousandth (1/1000) of the thickness T14 of the low-refractive-index layer 14. In addition thereto or as an alternative thereof, the arithmetic roughness average (Ra) of the interface F2 between the low-refractive-index layer 14 and the bonding layer 16 may be at least 0.5 nm, and the thickness of the low-refractive-index layer 14 may be at least 0.5 µm. When the composite substrate 10 satisfies these numerical requirements, the composite substrate 10 achieving the effect of the art disclosed herein can be manufactured with a relatively simple procedure.

As an example, a first sample was fabricated by configuring the electro-optic crystal substrate 12 as a lithium niobate substrate and the thickness T12 thereof as 1.5 µm. In this sample, the low-refractive-index layer 14 was constituted of silicon oxide, its thickness T14 was set to 0.7 µm, the bonding layer 16 was constituted of tantalum oxide, and its thickness T16 was set to 0.05 nm. The support substrate 18 was a lithium niobate substrate, having the thickness T18 of 1000 µm. The arithmetic roughness average (Ra) of the interface F1 between the electro-optic crystal substrate 12 and the low-refractive-index layer 14 was 0.2 nm, and the arithmetic roughness average (Ra) of the interface F2 between the low-refractive-index layer 14 and the bonding layer 16 was 0.7 nm. An optical modulator was manufactured using the first sample and electric signals in a range of 0 to 110 GHz were applied to the electro-optic crystal substrate 12. No ripples were detected in output signals of the optical modulator.

As another example, a second sample in which the thickness T14 of the low-refractive-index layer 14 in the aforementioned first sample was changed to 2.5 µm was fabricated. In this sample, the arithmetic roughness average (Ra) of the interface F1 between the electro-optic crystal substrate 12 and the low-refractive-index layer 14 was 0.2 nm, and the arithmetic roughness average (Ra) of the interface F2 between the low-refractive-index layer 14 and the bonding layer 16 was 2.5 nm.

An optical modulator was manufactured using the second sample and electric signals in the range of 0 to 110 GHz were applied to the electro-optic crystal substrate 12. No ripples were detected in output signals of the optical modulator.

Figure 3:
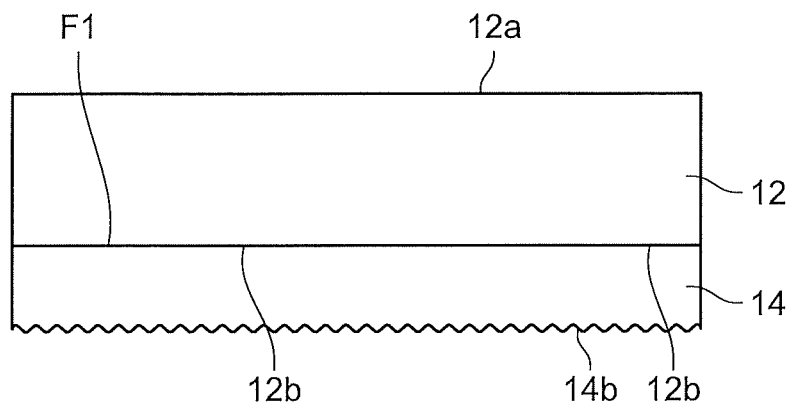
FIG. 3 shows a step of a method of manufacturing the composite substrate 10 of the first embodiment.

Hereinbelow, a method of manufacturing the composite substrate 10 will be described with reference to FIGS. 3 to 7. Firstly, as shown in FIG. 3, the electro-optic crystal substrate 12 is prepared and the low-refractive-index layer 14 is formed on the lower surface 12b of the electro-optic crystal substrate 12. In doing so, a roughness of a lower surface 14b of the low-refractive-index layer 14 is increased to be larger than a roughness of the lower surface 12b of the electro-optic crystal substrate 12. As a specific example, at the stage when the electro-optic crystal substrate 12 is prepared, the arithmetic roughness average (Ra) of the lower surface 12b of the electro-optic crystal substrate 12 may preferably be in a range from 0.03 nm to 0.5 nm. Further, the arithmetic roughness average (Ra) of the lower surface 14b of the low-refractive-index layer 14 may preferably be in a range from 0.5 nm to 500 nm.

Formation of the low-refractive-index layer 14 can be performed by sputter deposition, but not particularly limited thereto. When the low-refractive-index layer 14 is formed by the sputter deposition, the roughness of the lower surface 14b of the low-refractive-index layer 14 naturally becomes larger than the roughness of the lower surface 12b of the electro-optic crystal substrate 12. Especially when the low-refractive-index layer 14 is constituted of silicon oxide, this tendency is more prominently exhibited. As such, when the low-refractive-index layer 14 is formed by the sputter deposition, a process of roughening the lower surface 14b of the low-refractive-index layer 14 can be either omitted or simplified. However, a method of forming the low-refractive-index layer 14 is not limited to the sputter deposition, and it may for example be various vapor depositions such as a physical vapor deposition (PVD) and a chemical vapor deposition (CVD), or thermal oxidization. Further, after the formation of the low-refractive-index layer 14, a process of roughening the lower surface 14b of the low-refractive-index layer 14 (such as lapping, sand blast, and etching) may be performed as needed.

The electro-optic crystal substrate 12 may for example be a substrate of the x-cut or the y-cut (having the c-axis parallel to the substrate), or may be a substrate of a z-cut (having the c-axis vertical to the substrate). Further, if a reverse polarized portion is to be formed, the electro-optic crystal substrate 12 may be an offset substrate having the c-axis forming an angle less than or equal to 10 degree with a horizontal plane of the substrate.

Figure 4:
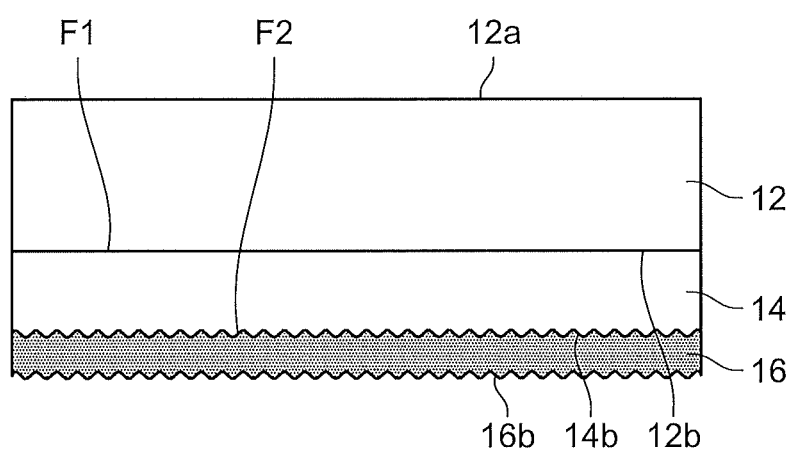
FIG. 4 shows a step of the method of manufacturing the composite substrate 10 of the first embodiment.
Figure 5:
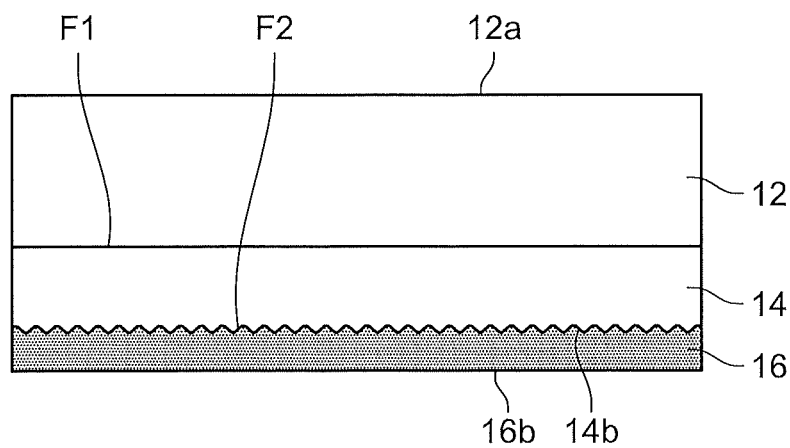
FIG. 5 shows a step of the method of manufacturing the composite substrate 10 of the first embodiment.

Next, as shown in FIG. 4, the bonding layer 16 is formed on the lower surface 14b of the low-refractive-index layer 14. The bonding layer 16 can be formed by sputter deposition, similar to the low-refractive-index layer 14. However, a step of forming the low-refractive-index layer 14 is not limited to the sputter deposition, and may for example be vapor deposition (physical or chemical vapor deposition). Next, as shown in FIG. 5, a lower surface 16b of the bonding layer 16 is smoothed by for example polishing. Since the bonding layer 16 is formed on the lower surface 14b of the low-refractive-index layer 14 having the large roughness, a roughness of the lower surface 16b of the bonding layer 16 may also relatively be larger. Due to this, prior to a step of bonding the support substrate 18 to be described later, the lower surface 16b of the bonding layer 16 may be smoothed as needed.

Figure 6:
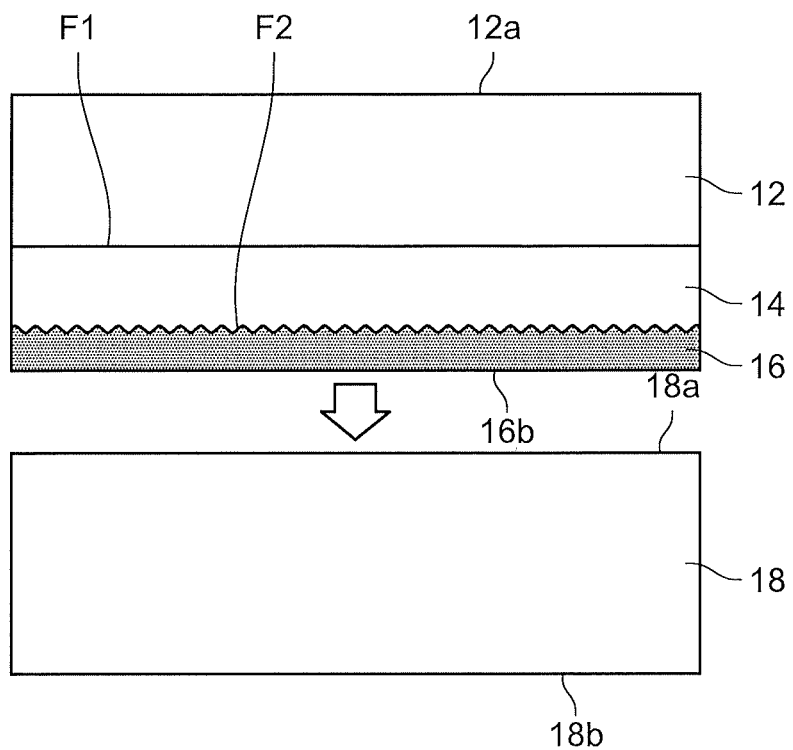
FIG. 6 shows a step of the method of manufacturing the composite substrate 10 of the first embodiment.
Figure 7:
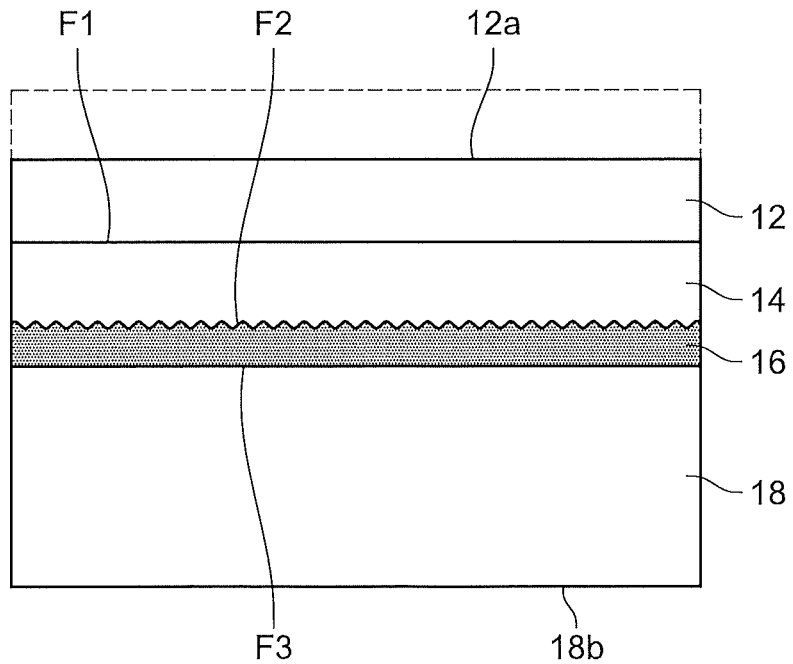
FIG. 7 shows a step of the method of manufacturing the composite substrate 10 of the first embodiment.

Next, as shown in FIG. 6, the support substrate 18 is prepared and the support substrate 18 is bonded to the lower surface 16b of the bonding layer 16. This bonding of the support substrate 18 may be performed by direct bonding, but not particularly limited thereto. Finally, as shown in FIG. 7, the electro-optic crystal substrate 12 is processed to the desired thickness by polishing the upper surface 12a of the electro-optic crystal substrate 12.

Figure 8:
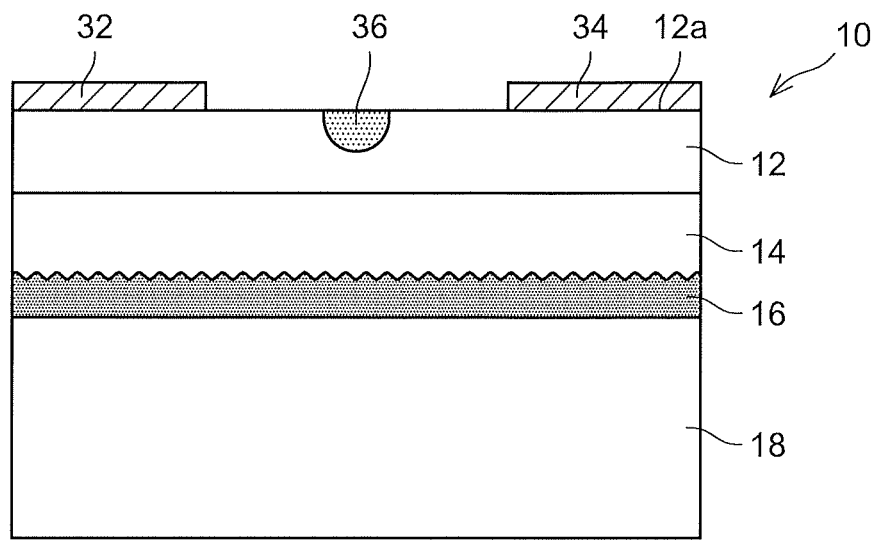
FIG. 8 shows a variant of the composite substrate 10, in which electrodes 32, 34 configured to apply electric signals to an electro-optic crystal substrate 12 and an optical waveguide region 36 disposed in the electro-optic crystal substrate 12 are added.

As shown in FIG. 8, electrodes 32, 34 may further be disposed on the composite substrate 10. These electrodes 32, 34 are disposed on the upper surface 12a of the electro-optic crystal substrate 12 for applying an electric signal to the electro-optic crystal substrate 12. A material constituting the electrodes 32, 34 only needs to be an electric conductor, and may for example be metal such as gold, silver, copper, aluminum, and platinum. The electrodes 32, 44 may each include a layer of titanium (Ti), chrome (Cr), nickel (Ni), or platinum as a base layer (lowermost layer) to be in contact with the electro-optic crystal substrate 12 for preventing exfoliation and migration of the electrodes 32, 34. Numbers, positions, and shapes of the electrodes 32, 34 are not particularly limited. As for the numbers of the electrodes 32, 34, they may suitably be determined in accordance with the number of the electro-optical elements manufactured from the composite substrate 10 and numbers of the electrodes 32, 34 which those electro-optic elements require. When the electrodes 32, 34 are predisposed on the composite substrate 10, a manufacturer of the electro-optic elements can easily manufacture the electro-optic elements from the composite substrate 10.

In addition thereto or as an alternative thereof, an optical waveguide region 36 may be disposed in the electro-optic crystal substrate 12 by doping impurities. In the electro-optic crystal substrate 12, its refractive index can selectively (that is, locally) be increased by doping specific impurities such as titanium or zinc, and the optical waveguide region 36 can thereby be formed. The number, a position, and a shape of the optical waveguide region 36 are also not particularly limited. For example, the number of the optical waveguide region 36 may suitably be determined in accordance with the number of the electro-optical elements manufactured from the composite substrate 10 and the number of the optical waveguide region 36 which those electro-optic elements require. When the optical waveguide region 36 is predisposed on the composite substrate 10, a manufacturer of the electro-optic elements can easily manufacture the electro-optic elements from the composite substrate 10.

Figure 9:
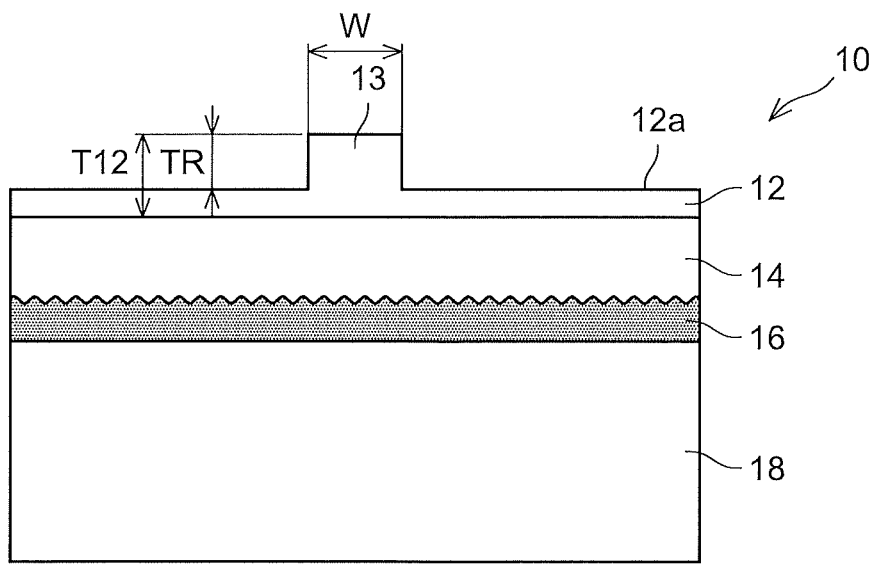
FIG. 9 shows a variant of the composite substrate 10, in which a ridge portion 13 is formed on an upper surface 12a of the electro-optic crystal substrate 12.

As shown in FIG. 9, a ridge portion 13 may be formed on the upper surface 12a of the electro-optic crystal substrate 12. The ridge portion 13 is a protrusion that extends long along the upper surface 12a. The ridge portion 13 configures a ridge type optical waveguide in the electro-optical elements manufactured from the composite substrate 10. When the ridge portion 13 is preformed on the composite substrate 10, manufacture of the electro-optic elements that require the ridge type optical waveguide can easily be performed. A width W of the ridge portion 13 may be, but not particularly limited to, at least 1 µm and 10 µm at most. A height TR of the ridge portion 13 may be, but similarly not particularly limited to, at least 10 percent and 95 percent at most of the thickness T12 of the electro-optic crystal substrate 12. The number, a position, and a shape of the ridge portion 13 are also not particularly limited. Although this is merely an example, when the composite substrate 10 is used for manufacturing a Mach-Zehnder electro-optic modulator, two ridge portions 13 which at least partially extend parallel to each other may be formed.

Figure 10:
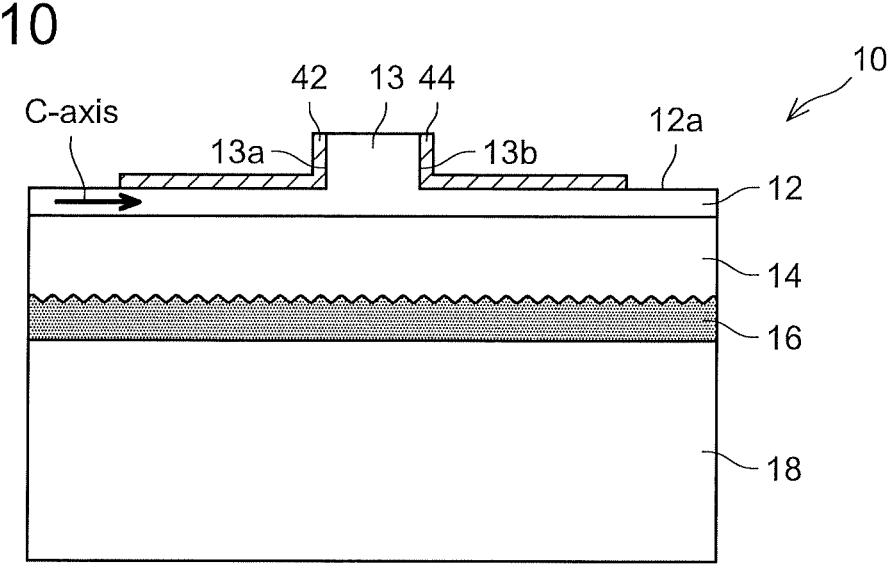
FIG. 10 shows a variant of the composite substrate 10, in which electrodes 42, 44 configured to apply electric signals to the ridge portion 13 are added. In this variant, a c-axis of the electro-optic crystal substrate 12 is parallel to the electro-optic crystal substrate 12.

As shown in FIG. 10, a first electrode 42 and a second electrode 44 may further be disposed on the composite substrate 10 having the ridge portion 13. Here, if the c-axis of the electro-optic crystal substrate 12 is parallel to the electro-optic crystal substrate 12, the first electrode 42 may be disposed on one side surface 13a of the ridge portion 13. Further, the second electrode 44 may be disposed on another side surface 13b of the ridge portion 13 and oppose the first electrode 42 across the ridge portion 13. According to such a configuration, the first electrode 42 and the second electrode 44 can apply an electric field to the ridge portion 13 being the optical waveguide in the electro-optic element in a direction parallel to the c-axis.

Figure 11:
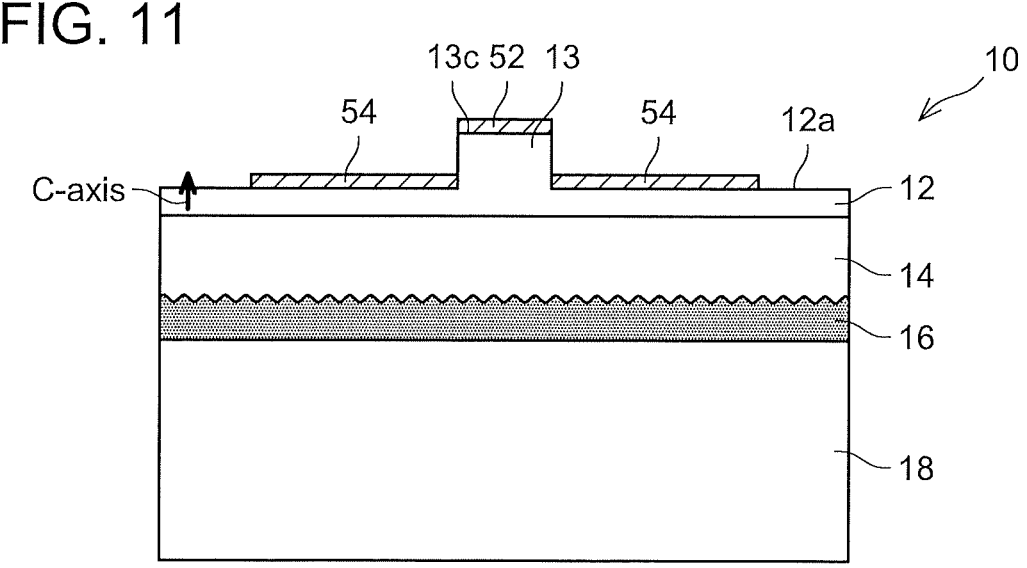
FIG. 11 shows a variant of the composite substrate 10, in which electrodes 52, 54 configured to apply electric signals to the ridge portion 13 are added. In this variant, the c-axis of the electro-optic crystal substrate 12 is perpendicular to the electro-optic crystal substrate 12.

As shown in FIG. 11, the c-axis of the electro-optic crystal substrate 12 may be perpendicular to the electro-optic crystal substrate 12. In this case as well, the ridge portion 13 may be formed on the upper surface 12a of the electro-optic crystal substrate 12. Further, a first electrode 52 and a second electrode 54 may further be disposed on the upper surface 12a of the electro-optic crystal substrate 12. However, the first electrode 52 is preferably disposed on a top surface 13c of the ridge portion 13 and the second electrode 54 is preferably disposed in a region within the upper surface 12a of the electro-optic crystal substrate 12 excluding the ridge portion 13. According to such a configuration, the first electrode 52 and the second electrode 54 can apply an electric field to the ridge portion 13 being the optical waveguide in the electro-optic element in a direction parallel to the c-axis.

Figure 12:
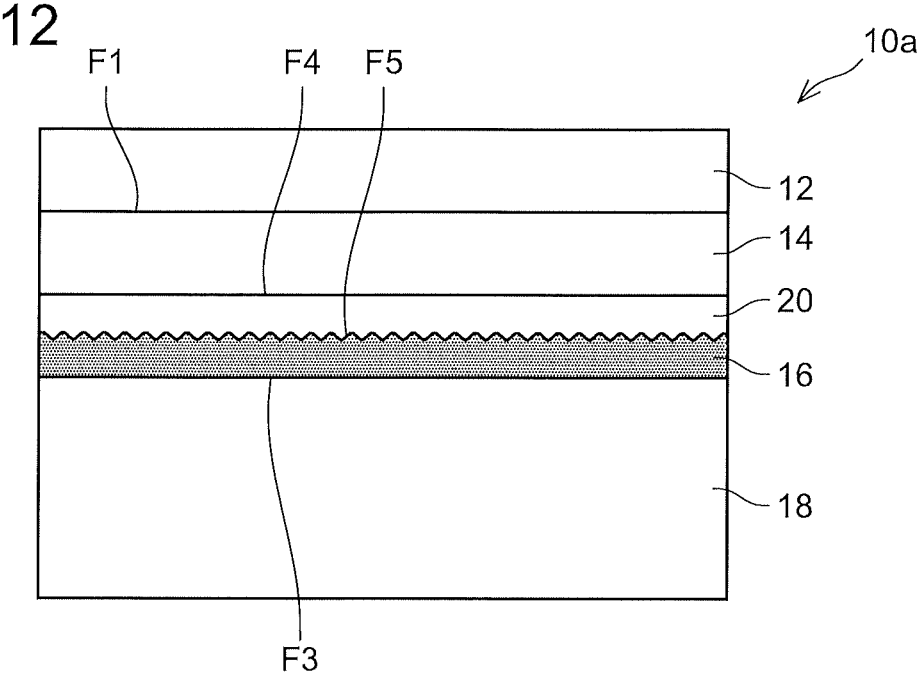
FIG. 12 schematically shows a cross-sectional structure of a composite substrate 10a of a second embodiment.

(Second Embodiment) A composite substrate 10a of a second embodiment will be described with reference to FIGS. 12 and 13. As shown in FIG. 12, the composite substrate 10a of the second embodiment further includes an intermediate layer 20 located between the low-refractive-index layer 14 and the bonding layer 16, and differs from the composite substrate 10 of the first embodiment in this regard. Further, an interface F5 between the intermediate layer 20 and the bonding layer 16 is configured, instead of the interface F2 between the low-refractive-index layer 14 and the bonding layer 16, as an interface having a larger roughness than the interface F1 between the electro-optic crystal substrate 12 and the low-refractive-index layer 14. With such a configuration as well, the resonance of the electromagnetic waves within the composite substrate 10a can be reduced by presence of the rough interface F5 in the composite substrate 10a. Instead of or in addition to the interface F5 between the intermediate layer 20 and the bonding layer 16, an interface F4 between the low-refractive-index layer 14 and the intermediate layer 20 may be an interface having a larger roughness than the interface F1 between the electro-optic crystal substrate 12 and the low-refractive-index layer 14. With presence of multiple rough interfaces, the electromagnetic waves propagating inside the composite substrate 10a along the thickness direction are even less likely to overlap each other in the same phase than in a case with only one rough interface, and the resonance of the electromagnetic waves can further be reduced.

Figure 13:
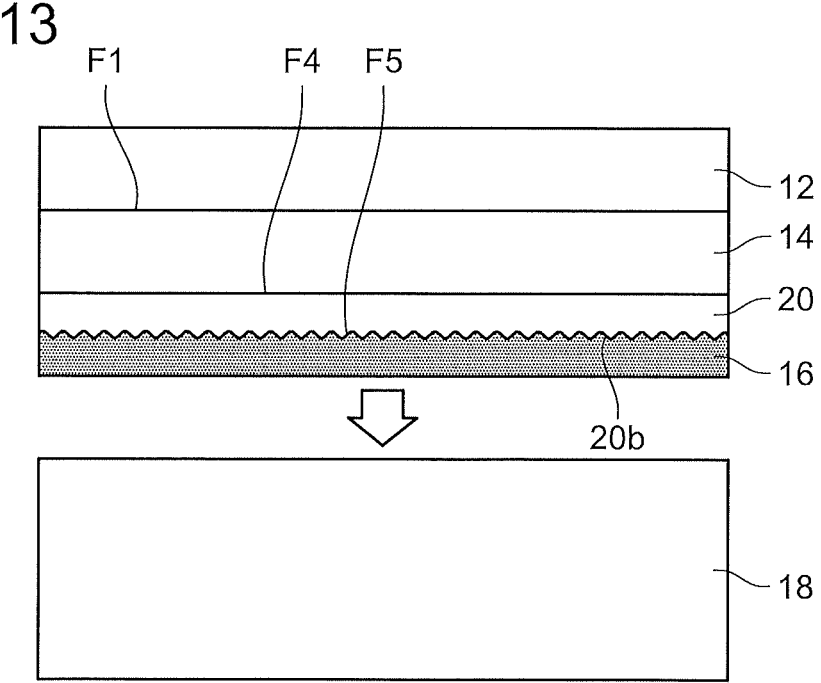
FIG. 13 is a diagram explaining a method of manufacturing the composite substrate 10a of the second embodiment.

As shown in FIG. 13, as for the composite substrate 10a of the present embodiment as well, it can be manufactured by bonding the electro-optic crystal substrate 12 to the support substrate 18. In this case, the intermediate layer 20 may be preformed on the electro-optic crystal substrate 12 between the low-refractive-index layer 14 and the bonding layer 16. Further, when the intermediate layer 20 is to be formed, a roughness of a lower surface 20b of the intermediate layer 20 may be increased. Due to this, the interface F5 between the intermediate layer 20 and the bonding layer 16 in the manufactured composite substrate 10 can be configured as the interface having the larger roughness than the interface F1 between the electro-optic crystal substrate 12 and the low-refractive-index layer 14.

A material constituting the intermediate layer 20 may be a material which may be employed in the low-refractive-index layer 14 or in the bonding layer 16. Further, it may be a material different from material(s) actually employed in the low-refractive-index layer 14 and the bonding layer 16. However, since the intermediate layer 20 is located between the electro-optic crystal substrate 12 and the rough interface F5, employment of electric conductors such as metal as the material constituting the intermediate layer 20 is preferably avoided so that the electromagnetic waves are not intercepted by the intermediate layer 20.

Figure 14:
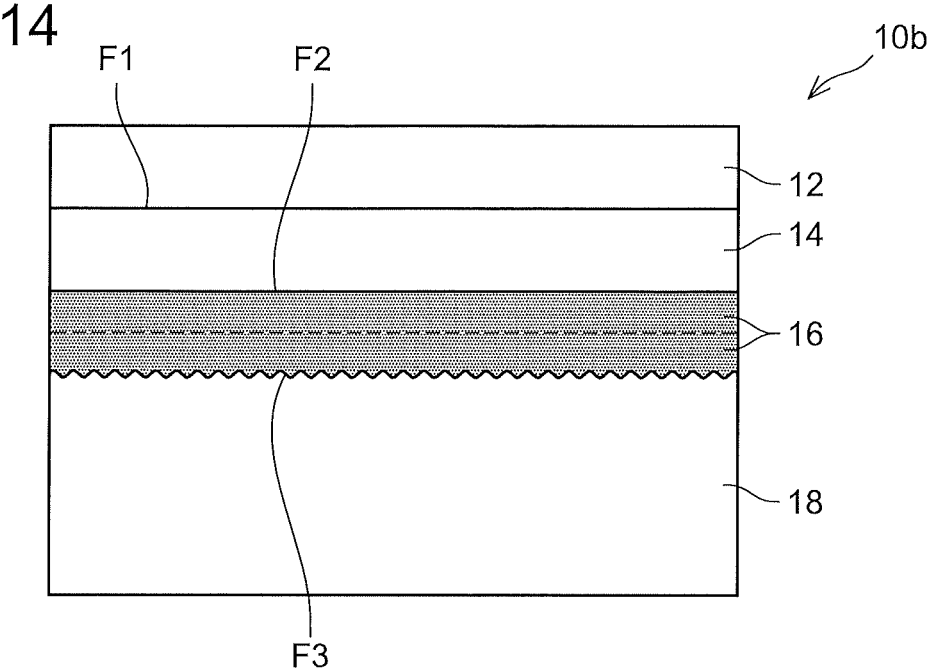
FIG. 14 schematically shows a cross-sectional structure of a composite substrate 10b of a third embodiment.

(Third Embodiment) A composite substrate 10b of a third embodiment will be described with reference to FIGS. 14 and 15. As shown in FIG. 14, in the composite substrate 10b of the third embodiment, the interface F3 between the bonding layer 16 and the support substrate 18 is configured as an interface having a larger roughness than the interface F1 between the electro-optic crystal substrate 12 and the low-refractive-index layer 14. With such a configuration as well, the resonance of the electromagnetic waves within the composite substrate 10b can be reduced by presence of the rough interface F3 in the composite substrate 10b. In addition to the interface F3 between the bonding layer 16 and the support substrate 18, another interface F2 may further be configured as an interface having a larger roughness than the interface F1 between the electro-optic crystal substrate 12 and the low-refractive-index layer 14.

Figure 15:
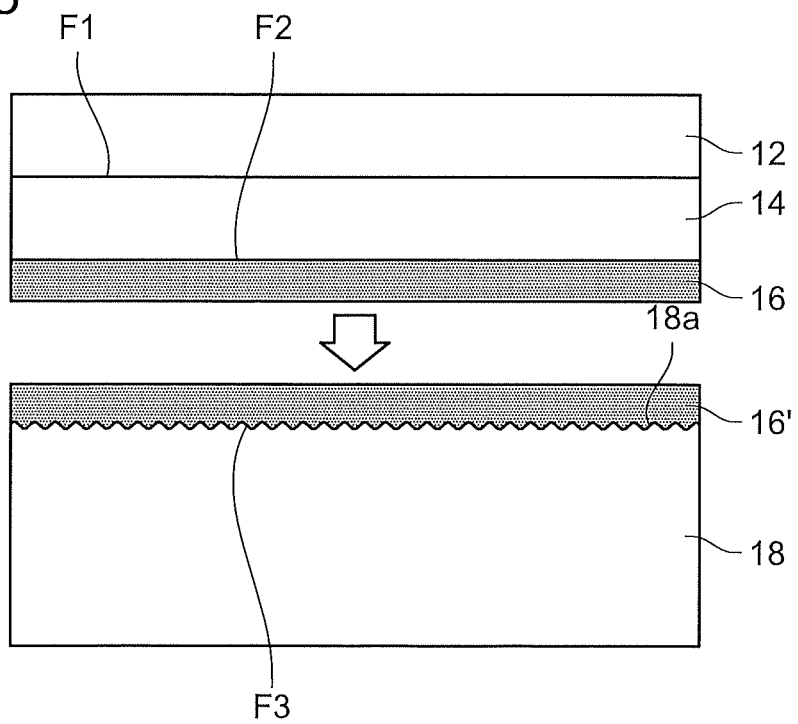
FIG. 15 is a diagram explaining a method of manufacturing the composite substrate 10b of the third embodiment.

As shown in FIG. 15, as for the composite substrate 10b of the present embodiment as well, it can be manufactured by bonding the electro-optic crystal substrate 12 to the support substrate 18. However, it is preferable to first roughen an upper surface 18a of the support substrate 18 and then form a bonding layer 16' on this upper surface 18a in advance. By doing so, the interface F3 between the bonding layer 16 and the support substrate 18 in the manufactured composite substrate 10b can be configured as the interface having the larger roughness than the interface F1 between the electro-optic crystal substrate 12 and the low-refractive-index layer 14. Further, due to the bonding layers 16, 16' being formed respectively on the electro-optic crystal substrate 12 and on the support substrate 18, the substrates 12, 18 can easily be bonded.

Figure 16:
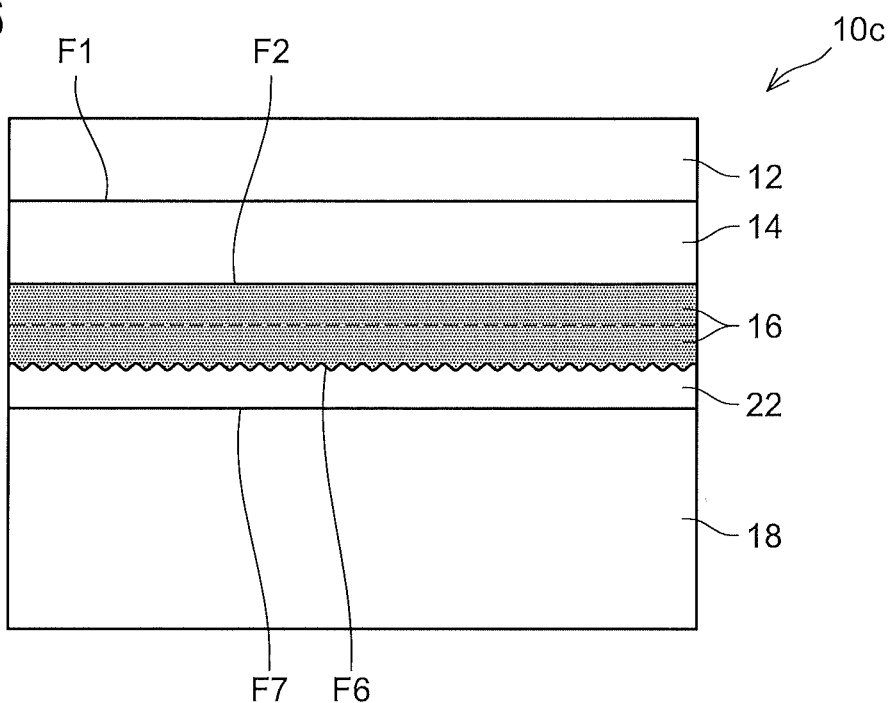
FIG. 16 schematically shows a cross-sectional structure of a composite substrate 10c of a fourth embodiment.

(Fourth Embodiment) A composite substrate 10c of a fourth embodiment will be described with reference to FIGS. 16 and 17. As shown in FIG. 16, the composite substrate 10c of the fourth embodiment further includes an intermediate layer 22 located between the bonding layer 16 and the support substrate 18, and differs from the composite substrate 10b of the third embodiment in this regard. Further, an interface F6 between the intermediate layer 22 and the bonding layer 16 is configured, instead of the interface F3 between the bonding layer 16 and the support substrate 18, as an interface having a larger roughness than the interface F1 between the electro-optic crystal substrate 12 and the low-refractive-index layer 14. With such a configuration as well, the resonance of the electromagnetic waves within the composite substrate 10c can be reduced by presence of the rough interface F6 in the composite substrate 10c. In addition to the interface F6 between the intermediate layer 22 and the bonding layer 16, other interfaces F2, F7 may further be configured as interfaces having a larger roughness than the interface F1 between the electro-optic crystal substrate 12 and the low-refractive-index layer 14.

Figure 17:
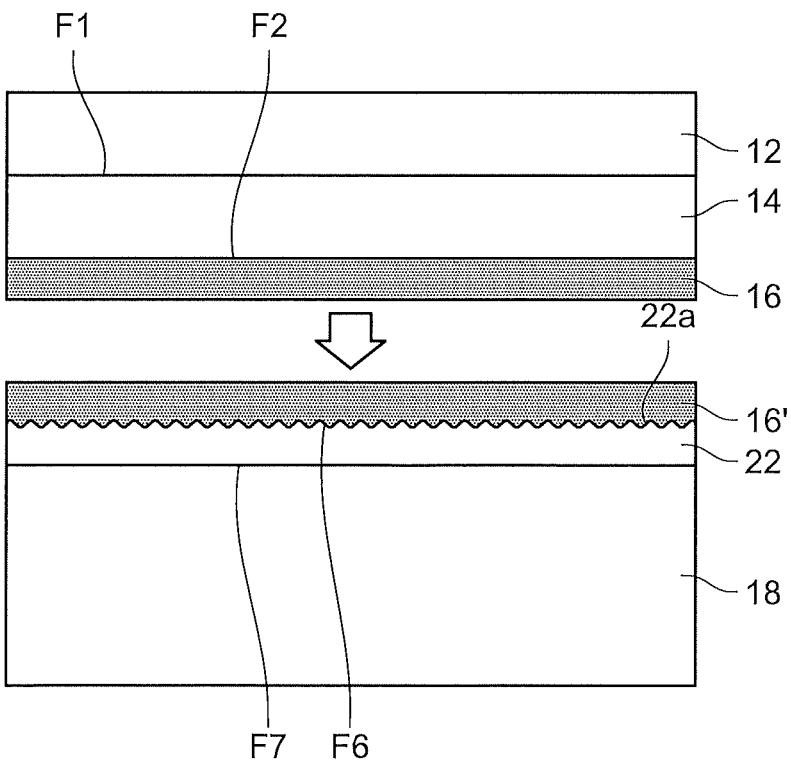
FIG. 17 is a diagram explaining a method of manufacturing the composite substrate 10c of the fourth embodiment.

As shown in FIG. 17, the composite substrate 10c of the present embodiment as well can be manufactured by bonding the electro-optic crystal substrate 12 to the support substrate 18. In this case, the intermediate layer 22 and the bonding layer 16' may be preformed on the support substrate 18. Further, when the intermediate layer 22 is formed, a roughness of an upper surface 22a of the intermediate layer 22 may be increased. Due to this, the interface F6 between the bonding layer 16 and the intermediate layer 22 in the manufactured composite substrate 10c can be configured as the interface having the larger roughness than the interface F1 between the electro-optic crystal substrate 12 and the low-refractive-index layer 14.

In the composite substrates 10 and 10a to 10c of the first to fourth embodiments, the bonding layer 16 and the intermediate layers 20, 22 may be constituted of electric conductors such as metal. However, when such a conductive layer is present, the electromagnetic waves propagating through the composite substrates 10 and 10a to 10c are intercepted without passing through the conductive layer, thus they propagate primarily in an area between the electro-optic crystal substrate 12 and the conductive layer. Due to this, the rough interface is preferably located in the area between the electro-optic crystal substrate 12 and the conductive layer where the electromagnetic waves primarily propagate.

REFERENCE SIGNS LIST

10: Composite Substrate
12: Electro-Optic Crystal Substrate
13: Ridge Portion
14: Low-Refractive-Index Layer
16, 16': Bonding Layer
18: Support Layer
20, 22: Intermediate Layer
32, 34, 42, 44, 52, 54: Electrode
36: Optical Waveguide Region
F1-F7: Interface

The invention claimed is:

1. A composite substrate for an electro-optic element, the composite substrate comprising:
    an electro-optic crystal substrate having an electro-optic effect and being an offset substrate having a c-axis that is not parallel with the electro-optic substrate, the c-axis forming an angle less than 10 degrees with a plane parallel with the electro-optic crystal substrate;
    a low-refractive-index layer in contact with the electro-optic crystal substrate and having a lower refractive index than the electro-optic crystal substrate; and
    a support substrate bonded to the low-refractive-index layer at least via a bonding layer,
    wherein a plurality of interfaces located between the low-refractive-index layer and the support substrate includes at least one rough interface having a roughness that is larger than a roughness of an interface between the electro-optic crystal substrate and the low-refractive-index layer,
    wherein an arithmetic roughness average Ra of the at least one rough interface is in a range from 0.5 nm to 10 nm.

2. The composite substrate according to claim 1, wherein a thickness of the low-refractive-index layer is in a range from 0.1 μm to 10 μm.

3. The composite substrate according to claim 1, wherein a thickness of the electro-optic crystal substrate is in a range from 0.1 μm to 10 μm.

4. The composite substrate according to claim 1, wherein the roughness of the at least one rough interface is at least three times the roughness of the interface between the electro-optic crystal substrate and the low-refractive-index layer.

5. The composite substrate according to claim 1, wherein the roughness of the at least one rough interface is at least five times the roughness of the interface between the electro-optic crystal substrate and the low-refractive-index layer.

6. The composite substrate according to claim 1, wherein an arithmetic roughness average Ra of the interface between the electro-optic crystal substrate and the low-refractive-index layer is in a range from 0.03 nm to 0.5 nm.

7. The composite substrate according to claim 1, wherein the at least one rough interface is an interface between the low-refractive-index layer and the bonding layer.

8. The composite substrate according to claim 7, wherein an arithmetic roughness average Ra of the interface between the low-refractive-index layer and the bonding layer is at least one thousandth of a thickness of the low-refractive-index layer.

9. The composite substrate according to claim 7, wherein a thickness of the low-refractive-index layer is at least 0.5 μm.

10. The composite substrate according to claim 1, wherein the at least one rough interface is an interface between the bonding layer and the support substrate.

11. The composite substrate according to claim 1, further comprising an intermediate layer located between the low-refractive-index layer and the bonding layer, wherein the at least one rough interface is an interface between the intermediate layer and the bonding layer.

12. The composite substrate according to claim 1, further comprising an intermediate layer located between the bonding layer and the support layer, wherein the at least one rough interface is an interface between the intermediate layer and the support layer.

13. The composite substrate according to claim 1, further comprising a conductive layer comprising an electric conductor,
wherein the at least one rough interface includes one or more interfaces located between the electro-optic crystal substrate and the conductive layer.

14. The composite substrate according to claim 13, wherein the conductive layer is at least a part of either the bonding layer or the intermediate layer.

15. The composite substrate according to claim 1, wherein the electro-optic crystal substrate is a substrate of lithium niobate, lithium tantalate, potassium titanyl phosphate, potassium lithium niobate, potassium niobate, potassium tantalate niobate, or a solid solution of lithium niobate and lithium tantalate.

16. The composite substrate according to claim 1, wherein the low-refractive-index layer comprises at least one substance selected from a group consisting of silicon oxide, tantalum oxide, aluminum oxide, magnesium fluoride, and calcium fluoride.

17. The composite substrate according to claim 1, wherein the bonding layer comprises at least one substance selected from a group consisting of tantalum oxide, niobium oxide, silicon, aluminum oxide, titanium oxide, gold, silver, copper, aluminum, platinum, and an alloy containing at least two of the aforementioned metal elements.

18. The composite substrate according to claim 1, wherein the support layer is a substrate comprising lithium niobate, lithium tantalate, silicon, glass, sialon, mullite, aluminum nitride, silicon nitride, magnesium oxide, sapphire, quartz, crystal, gallium nitride, silicon carbide, or gallium oxide.

19. The composite substrate according to claim 1, wherein a reverse polarized portion is formed in the electro-optic crystal substrate.

20. A method of manufacturing a composite substrate for an electro-optic element, comprising:
forming a low-refractive-index layer on a surface of an electro-optic crystal substrate having an electro-optic effect, the low-refractive-index layer having a lower refractive index than the electro-optic crystal substrate, the electro-optic crystal substrate being an offset substrate having a c-axis that is not parallel with the electro-optic crystal substrate, the c-axis forming an angle less than 10 degrees with a plane parallel with the electro-optic crystal substrate;
forming a bonding layer on a surface of the low-refractive-index layer formed on the electro-optic crystal substrate; and
bonding a support substrate on a surface of the bonding layer formed on the low-refractive-index layer,
wherein a roughness of the surface of the low-refractive-index layer before the forming of the bonding layer is larger than a roughness of the surface of the electro-optic crystal substrate before the forming of the low-refractive-index layer,
wherein an arithmetic roughness average Ra of the surface of the low-refractive-index layer before the forming of the bonding layer is in a range from 0.5 nm to 10 nm.

21. The method according to claim 20, further comprising smoothing the surface of the bonding layer between the forming of the bonding layer and the bonding of the support substrate.

22. The method according to claim 20, wherein the forming of the low-refractive-index layer comprises forming the low-refractive-index layer by sputter deposition.

23. The method according to claim 20, further comprising forming a bonding layer on a surface of the support substrate before the bonding of the support substrate.

* * * * *